US00RE39627E

(19) United States
(12) Reissued Patent
Tanner et al.

(10) Patent Number: US RE39,627 E
(45) Date of Reissued Patent: May 15, 2007

(54) DEVICE AND METHOD PREVENTING ION SOURCE GASES FROM ENTERING REACTION/COLLISION CELLS IN MASS SPECTROMETRY

(75) Inventors: Scott D. Tanner, Aurora (CA); Dmitry R. Bandura, Aurora (CA); Vladimir I. Baranov, Richmond Hill (CA)

(73) Assignee: MDS Inc., Etobicoke (CA)

(21) Appl. No.: 11/020,088

(22) Filed: Dec. 23, 2004

Related U.S. Patent Documents

Reissue of:
(64) Patent No.: 6,630,665
Issued: Oct. 7, 2003
Appl. No.: 09/678,395
Filed: Oct. 3, 2000

(30) Foreign Application Priority Data

Aug. 30, 2000 (CA) ..... 2317085

(51) Int. Cl.
*H01J 49/00* (2006.01)

(52) U.S. Cl. ..... 250/306; 250/281; 250/306; 250/492.3

(58) Field of Classification Search ..... None
See application file for complete search history.

(56) References Cited

U.S. PATENT DOCUMENTS 4,746,794 A * 5/1988 French et al. ..... 250/288
5,049,739 A * 9/1991 Okamoto ..... 250/281
5,381,008 A * 1/1995 Tanner et al. ..... 250/288
5,481,107 A * 1/1996 Takada et al. ..... 250/281
5,565,679 A * 10/1996 Tanner et al. ..... 250/288
5,672,868 A * 9/1997 Mordehai et al. ..... 250/281

FOREIGN PATENT DOCUMENTS

WO WO98/56030 * 10/1998

OTHER PUBLICATIONS

D.J. Douglas, *Some Current Perspectives on ISP–MS*, Canadian Journal of Spectroscopy, vol. 34, No. 2, 1989, pp. 38–49.*
John T. Rowan et al., *Attenuation of Polyatomic Ion Interferences in Inductively Coupled Plasma Mass Spectrometry by Gas–Phase Collisions*, Society for Applied Spectroscopy, vol. 43, No. 6, 1989, pp. 976–980.*
I. B. Brenner, *Characterization of a New Collision Cell ICP–MS for Environmental and Geochemical Analysis*, 2000 Winter Conference on Plasma Spectrochemistry, Fort Lauderdale, FL., pp. 338–339.*
Agilent Technologies Inc. Publication #5968–8813E, Dec. 1999, pp. 1–12.*
Presentation #55 at FACSS, Oct. 25, 1999 (abstract).*
Takuyuki Nabeshima et al., *Development of Ion Trap Mass Spectrometer with Plasma Ion Source*, 2000 Winter Conference on Plasma Spectrochemistry, Fort Lauderdale, FL. (abstract).*
*Inductively Coupled Plasma Mass Spectrometry*, ed. A. Montaser, 1998, p. 428.*

* cited by examiner

*Primary Examiner*—Jack Berman
*Assistant Examiner*—Zia R. Hashmi
(74) *Attorney, Agent, or Firm*—McDermott Will & Emery LLP

(57) ABSTRACT

A mass spectrometer has an ion source for producing sample ions. The ions pass through an ion interface, to a reaction/collision cell section. An ion-neutral decoupling device is provided between the ion interface and the reaction/collision cell section, to provide substantial separation between ions and neutral particles. The supersonic jet entering the spectrometer can have sufficient energy to cause the plasma gases, such as argon, to overcome the pressure differential between the reaction/collision cell and an upstream section of the spectrometer so as to penetrate into the reaction/collision cell; the decoupling device prevents this. The decoupling device can have offset apertures provided by plates or rods or other comparable arrangements, or can comprise a quadrupolar electrostatic deflector, an electrostatic sector deflector or a magnetic sector deflector.

10 Claims, 7 Drawing Sheets

DEVICE AND METHOD PREVENTING ION SOURCE GASES FROM ENTERING REACTION/COLLISION CELLS IN MASS SPECTROMETRY

Matter enclosed in heavy brackets [ ] appears in the original patent but forms no part of this reissue specification; matter printed in italics indicates the additions made by reissue.

*This application, now U.S. Pat. No. 6,630,665, claims the benefit of priority to Canadian Patent Application Serial No. 2,317,085 filed on Aug. 30, 2000.*

FIELD OF THE INVENTION

This invention relates to an apparatus for and a method of detecting ions of interest by mass spectrometry, while the ions of interest or unwanted interference ions are being modified by collisions or reactions during their transport from an ion source to a detector. More specifically, the invention relates to the use of ion-molecule reactions that modify either analyte ions or interfering species, in order to effect an m/z shift, to separate isobaric analyte and interference ions from one another, to give better resolution for the analyte ions.

BACKGROUND OF THE INVENTION

In inductively coupled mass spectrometry (ICP-MS), a sample is fed into a plasma that is maintained in an excited or energized state by inductive coupling. Typically, the plasma gas is argon. The plasma typically comprises the analyte, usually a metal and usually ionized, and various other constituents, such as argon, oxygen, hydrogen and also water vapor, all of which will commonly be neutral but some (about 0.1%) may be ionized. For wet plasma, which is typically used, the content of the reactive neutrals such as H, O, and their various polyatomic combinations, is as high as 17%. The plasma, including these ions and neutrals, passes into a chamber maintained at approximately 4 Torr. From this chamber, the plasma passes through a skimmer into a chamber maintained at a low pressure off approximately $10^{-3}$ Torr. From this chamber, the ions are intended to pass into a reaction/collision cell. The reaction/collision cell commonly has a multipole rod set, and can be maintained at different pressures; for example when no reaction is required, it may be maintained at $10^{-5}$ Torr, while a pressure of $5\times10^{-3}$ Torr to $10^{-2}$ Torr is provided by a reaction/collision gas when reaction or collision induced dissociation (CAD) is required. The higher pressure is maintained in the reaction cell when it is desired to promote ion-molecule reactions or CAD. In such a case, a simple analysis would suggest that the higher pressure within the reaction cell would prevent neutral species from passing into the reaction cell, and only ions, driven by the potential gradient through the whole instrument, would overcome the pressure difference and pass into the reaction cell. However, this overlooks the significant velocity created by the expansion of the plasma from the atmospheric pressure to a region at 4 Torr, which creates a suspension expansion jet. Consequently, individual ions and neutrals within the supersonic expansion jet, after passing through a skimmer into the region at $10^{-3}$ Torr, may have sufficient kinetic energy to overcome the pressure differential between the higher pressure in the reaction/collision cell and lower pressure of the region at $10^{-3}$ Torr, and pass into the reaction/collision cell. More specifically, and as detailed below, the present inventors have now realized that it is possible for neutral species to pass into the reaction/collision cell.

Ion-molecule reaction cells are widely used in ICP MS. Their successful operation depends on how pure the reaction gas is. Inductively coupled plasma is the source of neutral particles, because 99.9% of the gases that constitute the plasma are not ionized. Usually, about $4\times10^{18}$–$2\times10^{19}$ molecules/$s^{-1}$ flow of neutral plasma particles enters the mass spectrometer, which is equivalent of 0.1–0.4 scc/s. If these neutral gas particles are entrained into the flow into the reaction cell, the reactions are not controlled anymore. Instead of the high purity reaction gas introduced on purpose to the cell, it now has a mixture of the reaction gas with entrained plasma gases, and these plasma gases constitute up to 17% of the reactive neutrals H, O and various polyatomic combinations of these. Despite the fact that the pressure in the pressurized cell (which typical flow of 0.03–0.3 scc/s) may be higher than the background pressure of the vacuum compartment where the cell is positioned, the gases from the plasma can still enter the cell, because, as noted, the plasma gas undergoes supersonic expansion in the plasma-vacuum interface, after which particles travel with the terminal speed of about 2,300 m/s, typically. The impact pressure of such high velocity gas particles can be sufficiently higher than the pressure of the reaction gas in the cell, so the neutral gas particles from plasma will be entrained into the reaction cell.

Similar processes are taking place in any other mass spectrometers, in which the ion source pressure is sufficiently higher than the pressure in a collision/reaction cell. A variety of the instruments now comprise collision devices for collisional cooling, collisional focusing or collision-induced dissociation. For example, in Electrospray Ionization Mass Spectrometry, the ion source is usually operated at atmospheric pressure, from which ionized and neutral particles are delivered into the lower pressure collision cell by a supersonic expansion. As noted above, the impact pressure of the expanding ion source gas may be greater than the collision cell pressure, so that the neutral gas particles from the ion source will be entrained into the collision cell, altering the composition of the collision gas. As a result, un-predicted and un-controlled dissociative and reactive collisions with the collision gas of altered composition may bring undesirable modifications to the ions that are to be detected by mass analysis.

A variety of ion-molecule reactions in pressurized mass-analyzing and ion transmitting devices have been successfully used in ICP Mass Spectrometry for chemical resolution of analyte ions from isobaric interfering species by use of a reaction cell. Douglas [Douglas, D. J. Canad J. Spectrosc. 1989, 34, 38] was first to report on discrimination between the rare earth elements and their oxides through the specificity of oxidation by the reactive gas. $Tb^+$ was shown to oxidize more readily with $O_2$ than $CeO^+$. The analyte ion ($^{159}Tb^+$) was moved to a higher m/z and could thus be measured as $TbO^+$. The interfering ion ($^{142}Ce^{17}O^+$) was not shifted to the same extent, thus providing a possible analytical advantage of achieving better signal-to-noise ratio for Tb signal measured as TbO in the presence of Ce in the sample. Shortly after, Rowan and Houk [Rowan, J. T.; Houk, R. S. Applied Spectrosc. 1989, 46, 976] reported on the removal of the interfering argide ions from the m/z of analyte ions of interest due to lower reactivity of the latter towards reaction gas such as $CH_4$.

The specificity of the analyte-interference chemical resolution in general and in both of the above-described cases is dependent on the reaction gas properties. When the interfering species are to be moved away from the m/z of the analyte ion, the reaction gas reactivity towards the analyte is desirably low, while being high towards the interfering species. On the other hand, when the analyte ion is to be moved from its m/z by conversion to a polyatomic ion, the reactivity of the gas towards the analyte ion should preferably be high and simultaneously should be low towards the interfering species. In the latter case, the reaction that converts the analyte ions should preferably have one or only few channels, so that the analyte ion current or signal is not distributed amongst many product ion currents and the detection capabilities are not compromised. The reactivity of the gas towards the interference should in this case be low, at least for any reaction channels that can produce from the interference product ions at the same m/z as that of the analyte product ions, i.e. one does not want any interference products to be isobaric with analyte product ions.

The inventors have recently shown that the highest effectiveness of reactive isobaric interference removal in ICP MS can be achieved only if the average number of ion-molecule collisions in the pressurized device is sufficiently high. Efficiency of $10^9$ of suppression of $Ar_+$ signal by reaction with $NH_3$ has been demonstrated with an average number of collisions of >20. This high efficiency of reactive removal of the interferences was shown to be accompanied by promotion of sequential reaction chemistry that produces multiple new species in the cell.

The present inventors have also realized that this sequential chemistry can be controlled and used, to eliminate undesired interferences. This is implemented by a technique, designated by the assignee, as a Dynamic Reaction Cell. Briefly, this requires the provision of voltages to the quadrupole rod set of the reaction cell, to provide a band pass, thereby ejecting ions outside the set pass band. This technique is described in more detail in WO98/56030, to the assignee of the present invention.

Persons skilled in this art will understand that the purity of the reaction gas, supplied to the reaction cell, is crucial for efficient control of reaction chemistries in the pressurized reactor. Research grade high purity (99.999%) gases are preferable. Yet, as indicated above, the present inventors have realized that the biggest possible source of contamination of the reaction gas resides in the mass spectrometry system itself. The plasma-vacuum interface necessarily causes large amounts of neutral molecular and atomic gases from the ion source (Ar, O, $O_2$, H, $H_2$, $H_2O$) to enter the vacuum chamber. It is a well known fact that the degree of ionization of the plasma sustaining gases in ICP is low (0.04–0.1%), and thus the majority of the plasma species are neutral. Such partially ionized plasma-gas mixture enters the chamber at a high velocity, which is related to the terminal velocity of the supersonic expansion jet formed behind the skimmer interface. This velocity determines both neutral and ionized components trajectories, at least during the initial stages of the partially ionized gas propagation in the vacuum system. It may thus be said that the ionized and neutral components are coupled (their trajectories are co-defined by the same factors). The high velocity neutral gas particles may penetrate into the reaction chamber if it is positioned in line with their trajectories.

To applicants and assignee's knowledge, many other users of ICP MS with a reaction cell intend the reaction cell to remove unwanted interferences, without affecting the analyte. Commonly, the analyte is a metal, which is intended to be detected directly, i.e. without previous reaction to some compound thereof. As such, the issue of contaminants in the reaction gas reacting with the metal is a concern, as common analytes may react readily with major contaminants; for example many metals react significantly with water to form an oxides, thus compromising detection capabilities of the metals.

On the other hand, the assignee of the present invention has recently started to promote the use of oxides for detection. For this purpose, $N_2O$, or other suitable reaction gas is provided in the reaction cell, to promote the conversion of analyte metal ions to their oxides. As noted above, for Tb as example, this can give improved results and eliminate problems due to isobaric interferences. However, a potential disadvantage with this technique is that oxides may react more readily with contaminants introduced from the plasma gas flow. For example, water vapour may convert an oxide to a hydroxide.

For example Rb and Sr have similar isotopes at m/z 87. Their ratio is widely used for measuring the age of the rock samples in geochronoly. To distinguish between them in ICP MS, $Sr^+$ is oxidized by reactions with $N_2O$, to give $^{87}SrO^+$ at m/z=103. $N_2O$ is non-reactive towards $Rb^+$, so that $^{87}Rb^+$ does not oxidize readily and stays at m/z=87. Sr also has other isotopes at m/z=86 and 88. $SrO_+$ reacts with water to form $^{86\ SrOH+}$ at m/z=103. If any of water is entrained in the reaction gas by the processes described above, the detection of $^{87}Sr^+$ as $^{87}SrO^+$ is compromised by the interference from $^{86\ SrOH+}$.

It is thus the purpose of the present invention to provide apparatus and method for controlled ion-molecule reactions in ICP Mass Spectrometry, that would ensure that predictability and specificity of the desired reaction chemistry in ion-molecule reactor is not compromised by uncontrolled dilution of the reaction gas by gas particles and other neutral species originating from the plasma or plasma-vacuum interface. Although described predominantly for use with an ion-molecule reactor and ICP plasma, the invention is not limited to this particular configuration and may be used in any device where neutral species can enter pressurized CAD or reaction chamber and promote reactions or collisions of ions with undesirable neutral species.

There are ICP MS devices on the market that have the reaction/collision cell in the direct sight of the neutral particles that propagate from the plasma (Micromass Platform and VG ExCell). The promotion of oxidation reactions on the VG Excell collision cell pressurized with He or He—$H_2$ mixture was shown in presentation by J. Godfrey, I. B. Brenner, P. Sigsworth and J. Bathey [Paper F7, 2000 Winter Conference on Plasma Spectrochemistry, Fort Lauderdale, Fla., Jan 10–15, 2000], which indicates that the collision gas also contained other than He and $H_2$ species, most likely entrained from the plasma gases.

There are various known proposals, either in patents or in commercially available devices, that improve the stability and reduce background count rate of the conventional ICP MS by removing the plasma particulates and photons from the direct sight of ion optics and/or detector. These include: photon stops and shadow stops (U.S. Pat. No. 4,746,794), Omega lens (Agilent HP7500 Series ICP MS, as shown in Agilent Technologies Inc. Publication # 5968-8813E, December 1999) or chicane lens (VG Excell, as was described by Jonathan Batey of VG Elemental in the presentation # 55 "Incorporating Collision Cell Technology into a Quadrupole ICP MS" at the 26$^{th}$ Annual Conference of the Federation of Analytical Chemistry and Spectroscopy Societies, Vancouver, Oct. 25, 1999), 90-degrees sector ion deflector (Hitachi ICP-ITMS, as described by Takayuki Nabeshima et al of Hitachi Ltd in the presentation FP34 "Development of Ion Trap Mass Spectrometer with Plasma Ion Source" at the 2000 Winter Conference on Plasma Spectrochemistry, Fort Lauderdale, Fla., Jan. 10–15, 2000) and off-axis transfer optical system (SPQ 9000 of Seiko Instruments, as shown in "Inductively Coupled Plasma Mass Spectrometry", ed. A. Montaser, Wiley-VCH 1998, p.428). All of those are used to either stop the photons and neutral plasma particles from reaching the detector and/or ion optical elements in order to improve stability and background.

Most importantly, none of these known proposals are used to prevent the plasma neutral particles from entering the reaction/collision cell. One exception is ICP MS Dynamic Reaction Cell (DRC) by the assignee of the present invention. This instrument uses a "shadow stop" to stop the neutral plasma particles from contaminating the ion optical elements (as disclosed in U.S. Pat. No. 4,746,794 assigned to MDS), and also serves as a photon stop. However, its effect on neutral plasma gases was not appreciated. For reasons given above, it was previously believed that it was only necessary to prevent photons from reaching the detector, and large metal particles, that originate from incompletely disintegrated sample, from contaminating downstream ion optics components. In a commercial ICP-MS, penetration of the neutral gas particles into the ion optics poses no significant difficulty. Further, it was not realized that neutral gas particles, including the plasma gas, could be a significant problem, as these particles are not charged and there should be no potential driving them further into the mass spectrometer. This analysis overlooks the effect of the supersonic expansion jet which is now realized to be important. Thus, it is now appreciated that this stop also serves the purpose of stopping the plasma gases from being entrained into the cell.

This effect has not been appreciated before. Indeed, it has recently become apparent that instruments made by the assignee do not promote unwanted formation of oxides to the same extent as instruments from other manufacturers. However, the reason for this was not recognized. It is now believed that this "shadow stop" prevents the plasma gas entering the collision cell. In contrast, in instruments from other manufacturers, it is believed that contamination of the reaction gas with the plasma gas, promotes reaction of oxides, as their "stopping" devices are positioned behind (as opposed to being in front of) the reaction cell, which for them is thus in a direct line of sight of the high velocity plasma neutral particles.

SUMMARY OF THE INVENTION

In accordance with a first aspect of the present invention, there is provided a mass spectrometer system comprising:

an ion source for producing an ion source stream comprising sample ions and neutrals;

an ion interface;

a reaction/collision cell section for processing the ions received from the ion interface, with the ion interface providing an interface for the ion source stream between the ion source and the reaction/collision cell section; and an ion-neutral decoupling device provided between the ion interface and the reaction/collision cell section, to provide substantial separation between ions and neutral particles.

As used in the specification including the claims, the term "reaction/collision cell section" is a cell operated of a suitable pressure to effect at least one of collision and reaction, as required.

In accordance with another aspect of the present invention, there is provided a method of operating a mass spectrometer system, in which ions are generated and processed, the method comprising:

(i) supplying a sample to an ion source and generating an ion source stream of ions, including sample ions and unwanted neutral particles;

(ii) separating neutral particles from an ion stream; and then (iii) passing the ion stream into a reaction/collision cell section.

BRIEF DESCRIPTION OF THE DRAWING FIGURES

For a better understanding of the present invention and to show more clearly how it may be carried into effect, reference will now be made, by way of example, to the accompanying drawings which show a preferred embodiment of the present invention and in which.

DESCRIPTION OF THE PREFERRED EMBODIMENT

Figure 1:
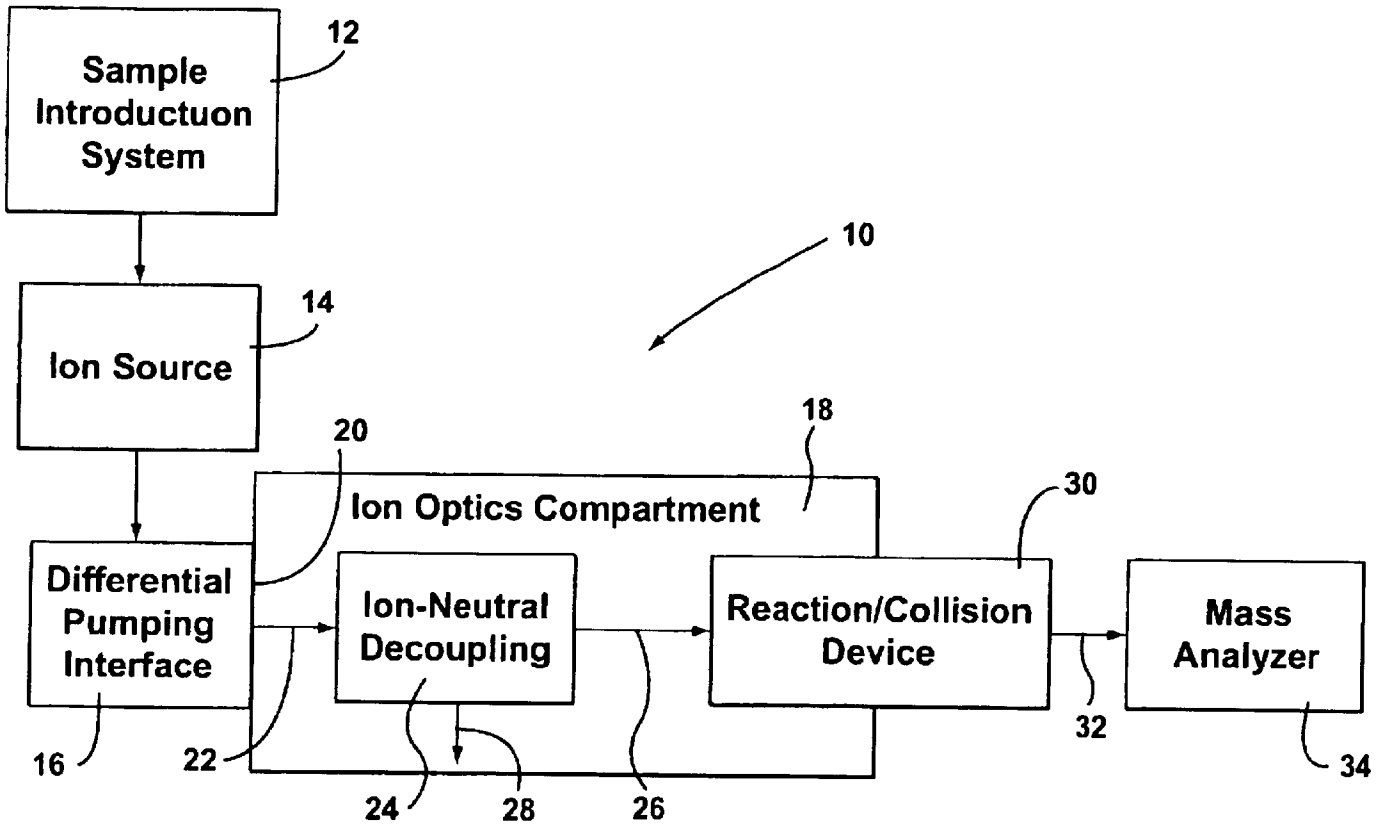
FIG. 1 is a schematic view of a mass spectrometer in accordance with the present invention.

Reference will first be made to FIG. 1, which shows a mass spectrometer indicated generally by the reference 10. The mass spectrometer 10 includes a sample introduction system 12, that can be any known and suitable sample introduction system. The sample introduction system 12 is connected to an ion source 14. Any suitable, known sample introduction system 12 and ion source 14 can be used. For example, these two elements 12, 14 can comprise an electro spray source, for generating ions from a sample analyte desolved in solution. A nebulizer/spray chamber/ICP is another example of an arrangement of the sample introduction system 12 and the ion source 14. However, any suitable sample introduction system and ion source can be used.

FIG. 1 inherently assumes that the ion source 14 is at higher pressure than the ion optics compartment 18. An ion source stream or plasma from the ion source 14 passes to a differential pumping interface 16. Commonly, for an atmospheric pressure source, this would be an intermediate pressure chamber operating at around 4 Torr.

From the pumping interface 16, the ion source stream passes into a compartment identified as an ion optics compartment 18. This will be maintained at a low pressure, typically $10^{-3}$ Torr. The wall 20 separating the ion optics compartment 18 from the differential pumping interface 16 can comprise a skimmer cone or the like. As described above, the pressure difference between the ion source 14 and differential pumping interface 16 creates a high velocity supersonic jet, indicated at 22, that enters the ion optics compartment 18. This supersonic jet would have the composition outlined above, i.e. typically sample particles, argon atoms largely neutral, and significant amounts of, for example, oxygen, hydrogen and their different polyatomic combinations, largely neutral.

Now, in accordance with the present invention, the supersonic jet 22 is passed directly into an ion-neutral decoupling device 24. This provides for deflection or separation of the supersonic jet into an ion stream 26 and a neutral gas flow 28. Although, in FIG. 1, the neutral gas flow 28 is shown as being deflected and the ion stream 26 as passing straight through, these flows could be reversed, such that the ion stream 26 is defected and the neutral gas flow 28 carries straight on through the ion optics compartment 18; these different configurations are described in detail below.

A reaction cell or collision device on cell 30 is provided. This reaction in collision cell is operated to effect at least one of reaction and collision and fragmentation, as required. As detailed above, this operates at a different pressure range, typically either in a range of $10^{-3}$ Torr–$10^{-2}$ Torr with a reaction gas present, or the low pressure of $10^{-5}$ Torr when no reaction is to take place. It is shown having one end forming an interface with the ion optics compartment and the other end outside of the ion optics compartment 18. For some applications, the reaction or collision cell device 30 could be located wholly within the ion optics compartment 18, so that the ion stream is subjected to the pressure of the ion optics compartment 18 both before and after passing through the collision device 30.

The ion stream leaving the collision device 30, indicated at 32, then passes to a mass analyzer indicated at 34.

FIG. 1 shows the base elements of the invention. It will be appreciated that, in accordance with this art, numerous variations are possible. Thus, for some applications, it may be desirable to effect a further collision step after collision in the collision device 30; this could be effected after some mass filtering step. In any event, all the mass spectrometer configurations disclosed in U.S. Pat. Nos. 4,746,794, 5,381,008 and 5,565,679, and also in published PCT application WO98/56030 can be considered for use for the present invention, and the contents of those three patents and that published application are hereby incorporated by reference.

FIGS. 2–9 show different variants of the ion-neutral decoupling device 24. In these figures, other elements of the mass spectrometer are also shown, and for simplicity, like elements in these figures are given the same reference numeral as in FIG. 1. The description of these elements is not repeated.

It is first noted that, for FIGS. 2–9, the sample introduction system 12, the ion source 14 and the differential pumping interface 16 are shown, schematically, as a single element, labeled as a 'ion source' and identified at 40. It will be understood that this ion source 40 comprises all the necessary components to produce a stream of ions and neutrals in a supersonic gas flow. The collision/reaction cell 30 is also shown in FIGS. 2–9, within the ion optics compartment 18.

Figure 2:
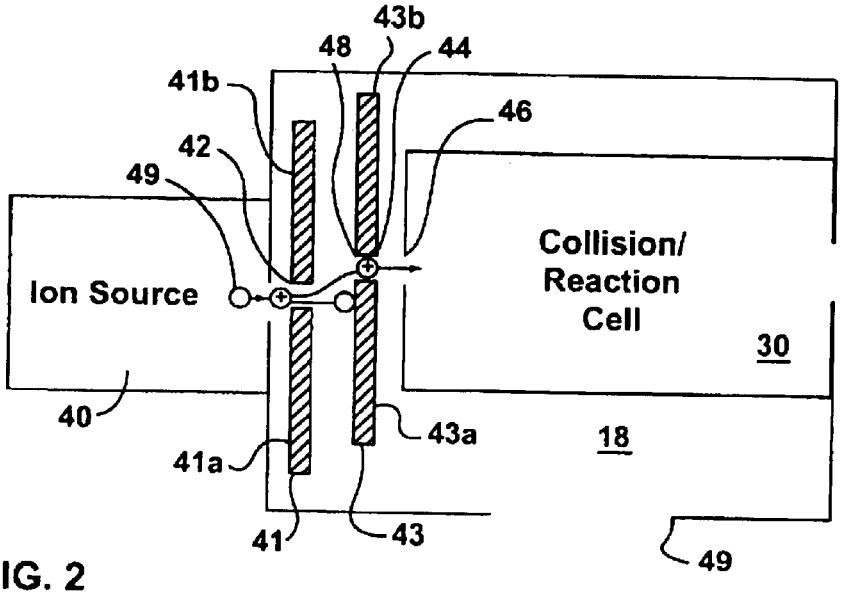
FIGS. 2–9 show eight different variants of the ion-neutral decoupling device of FIG. 1.

Referring first to FIG. 2, there is shown an arrangement with a pair of offset plates 41, 43, each including a respective aperture 42, 44. The aperture 44 is offset relative to aperture 42, so that there is no direct line of sight through the aperture 42 to the collision reaction cell 30. As shown, the aperture 44 is aligned with the entrance aperture, indicated at 46 for the reaction cell 30.

Ions are indicated by circles including '+' and indicated at 48, while neutral particles are indicated by plain circles at 49. Neutral particles 49 and ions 48 have high velocity acquired through supersonic expansion in the ion source 40. As shown, the neutral particles 49 pass straight through the aperture 42 and impact the second plate 43. The ions 48, on the other hand, are electrostatically deflected and pass through the aperture 44 and then the aperture 46 into the collision cell 30. In other arrangements, apertures 44 and 46 can be the same, so that aperture 44 is actually entrance aperture 46 of the collision/reaction cell 30, and the plate 43 is an entrance wall of the cell 30. The plates 41 and 43 can also be arranged such that they consist of separate half-plates 41a, 41b and 43a, 43b so that different electrical potentials could be applied to the half-plates in order to deflect ions. (The scheme of indicating ions 48 and neutral particles 49 with a circle including a '+' sign and a plain circle respectively is used for the remaining variants in FIGS. 3–9).

It is here noted that, in a known manner, the different sections of the whole mass spectrometer apparatus or device would be provided with appropriate pumps to maintain the desired pressure. Additionally, these pumps, in known manner, can be cascaded. For example, a roughing pump maintaining a pressure of the order of a few Torr can also be used to backup a higher performance pump maintaining pressures of the order of mTorr or lower in the ion optics compartment. At 49 in FIG. 2, and also FIGS. 3–9, there is shown an opening for connection to such a pump.

Figure 3:
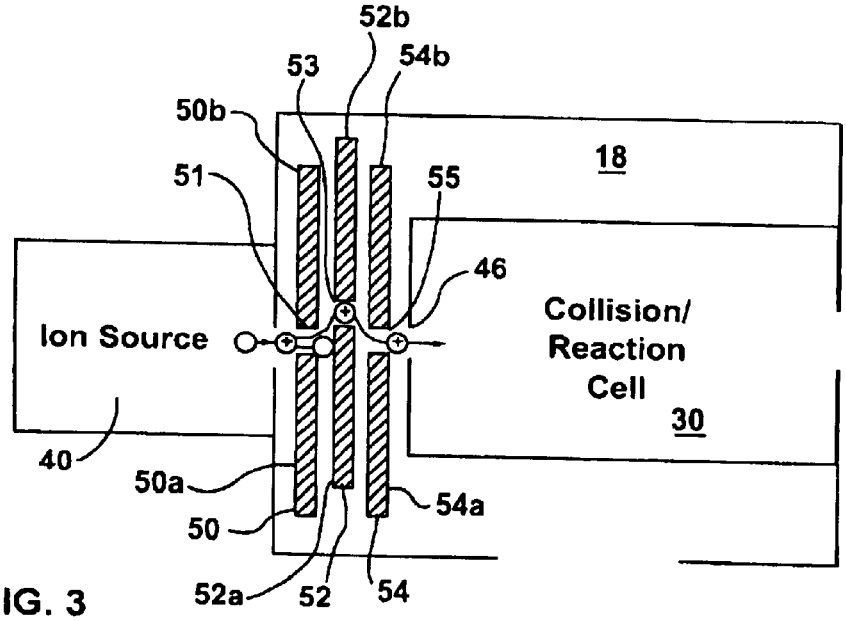

Referring now to FIG. 3, this shows a configuration, similar to FIG. 2, but including three plates indicated at 50, 52 and 54, and including respective apertures 51, 53 and 55. Here, the apertures 51 and 55 are aligned with the entrance aperture 46 of the collision/reaction cell 30, but there is no direct line of sight into the reaction cell 30. This is due to the presence of the intermediate plate 52, whose aperture 53 is offset, to create a 'chicane' effect. As shown, this requires the ions 48, as viewed in FIG. 3, to first be deflected upwards and then deflected downwards, in order to pass into the reaction cell 30. Similarly to the FIG. 2, the plates 50, 52 and 54 can consist of separated half-plates 50a, 50b, 52a, 52b and 54a, 54b, respectively, to allow application of appropriate electric potentials to deflect the ions. Neutral gas particles from the ion source 40 then impact the plate 52 and do not pass to the reaction cell 30. The supersonic flow component on axis with the reaction cell aperture 46 is disrupted so that the impact pressure is not high enough for the neutrals from the supersonic flow to be entrained in the reaction cell 30.

Figure 4:
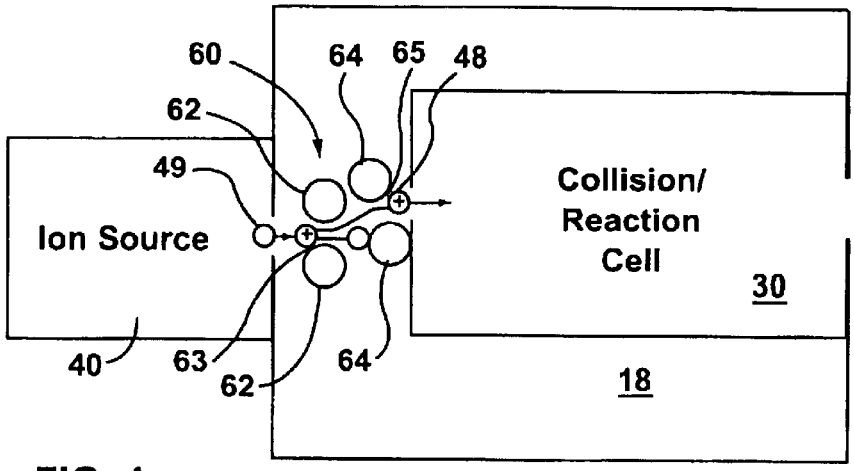

Referring to FIG. 4, this shows an ion-neutral decoupling device 60, which comprises a first pair of rods 62 and a second downstream pair of rods 64. The rods 62 form a slit 63, through which the ions and neutral gas particles can pass. The rods 64 provide a similar slit 65, but this is offset, so that again there is no direct line of sight from the ion source 40 into the collision/reaction cell 30. Consequently, as shown, the neutral particles 40 tend to impact one of the rods 64, while the ions 48 flow through into the collision/reaction cell 30.

Figure 5:
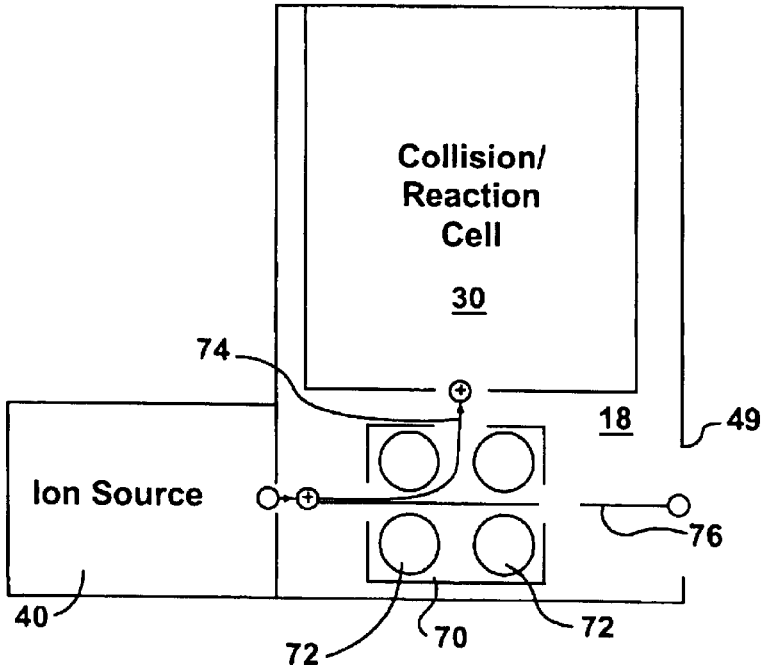

Referring now to FIG. 5, a fourth embodiment or variant of the decoupling device is indicated at 70 comprises a quadrupolar electrostatic deflector. This has four rods 72, although it be understood by a skilled person that these could comprise four elements providing an accurate hyperbolic surfaces. The rods 72 would be provided with a DC potential, to establish the desired electrostatic field, as known in the art.

This embodiment of FIG. 5, unlike FIGS. 2, 3 and 4, does not follow the scheme shown in FIG. 1, in that ions from the source 40 are deflected, as indicated at 74, towards the collision/reaction cell, which is now located orthogonal to the original ion stream. Neutral gas particles alike, on the other hand, are not affected by the electrostatic field, and pass directly through the decoupling device 70, as indicated at 76, flowing out through the opening 49 to a pump.

Figure 6:
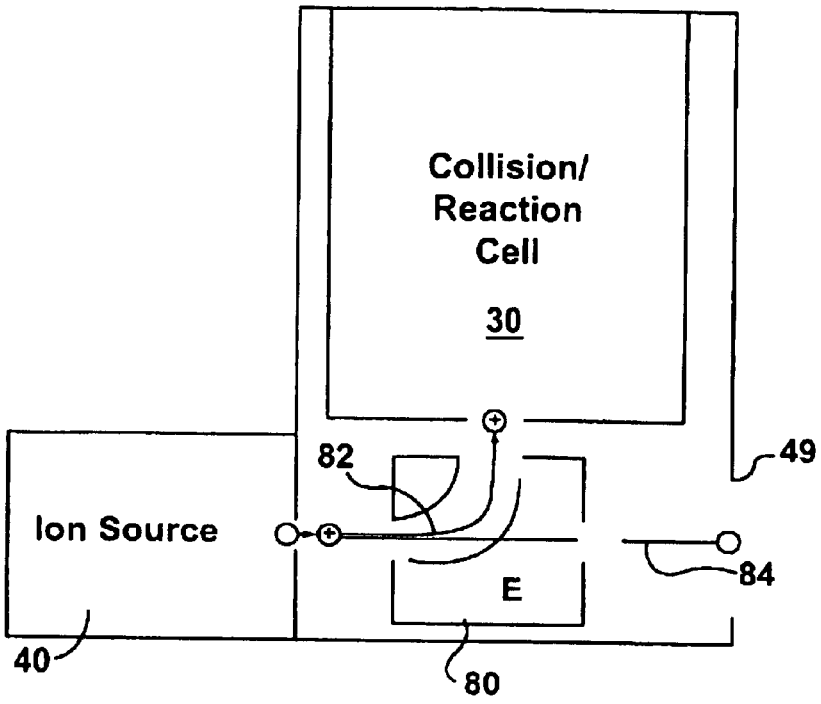

FIG. 6 shows another arrangement where the ion beam is deflected. Here, an electrostatic sector deflector is indicated at 80 and deflects the ion beam, here indicated at 82 into the collision/reaction cell 30, which is again located orthogonal to the original ion beam. It is to be understood that the 90° arrangement of FIG. 6, and also other Figures, is preferred but not essential; any angle that prevents the impact pressure of the neutral beam exceeding the pressure inside the reaction cell is suitable with appropriate arrangement of the deflector.

Figure 7:
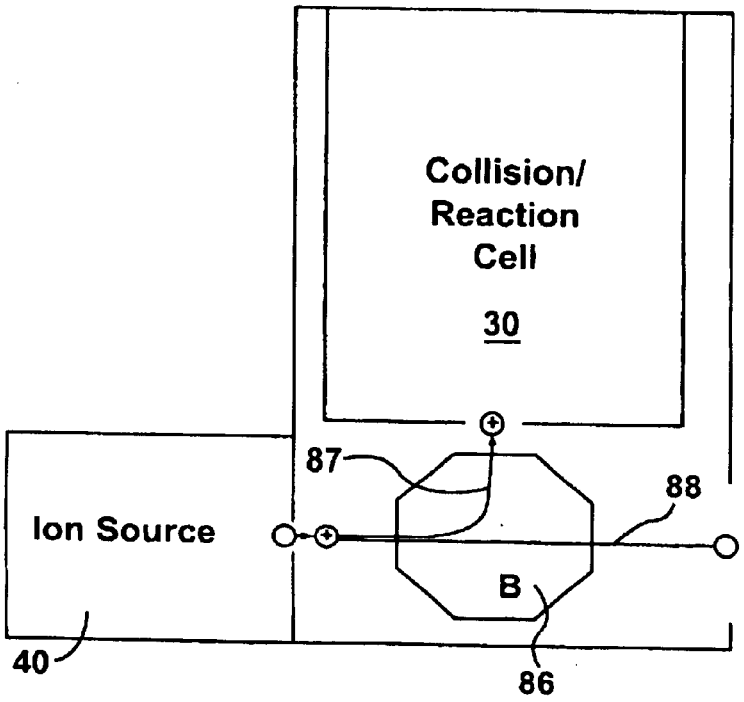

FIG. 7 shows a third arrangement where the collision cell 30 is arranged at an angle, again 90° in this specific example shown, to the axis of the ion source 40. Here, a magnetic sector deflector 86 is provided. The ion beam is shown at 87 and the neutral particle beam at 88, these beams 87, 88 following paths as for the earlier embodiments. Again, a 90° arrangement is not essential, and any suitable angle can be used, which ensures adequate separation of the ion beam and the beam or stream of neutral gas particles.

Figure 8:
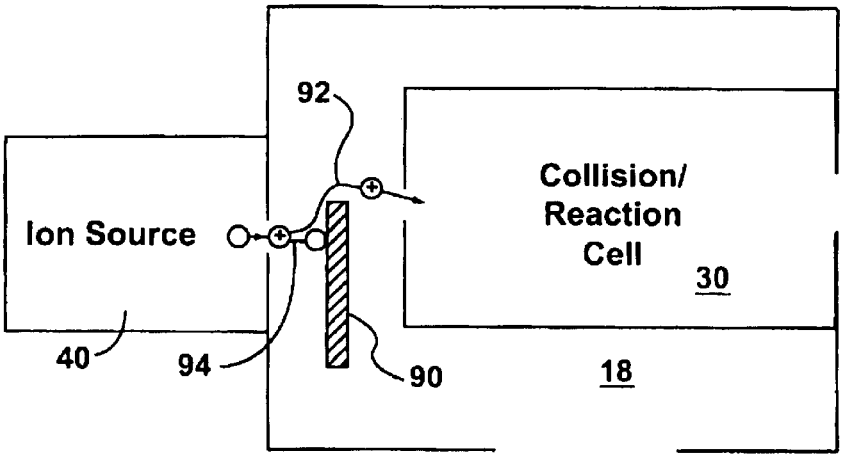

FIG. 8 shows what can be considered to be a variant of FIGS. 2 and 3. Here, a simple plate or obstruct 90 is provided, obstructing any direct line of sight between the ion source 40 and the reaction cell 30. This causes ions to be deflected, as indicated at 92. Again, neutral particles 94, unaffected by any potential gradient present, simply impact the obstacle 90. This disrupts the supersonic flow so that the neutrals do not entrain significantly into the reaction cell 30, while a downstream electrostatic field or potential gradient causes the ions to follow the path indicated at 92 into the reaction cell 30. The embodiment shown in FIG. 8 can be as per U.S. Pat. Nos. 5,381,008 or 5,565,679, that describes different configurations of the obstacle at 90.

Figure 9:
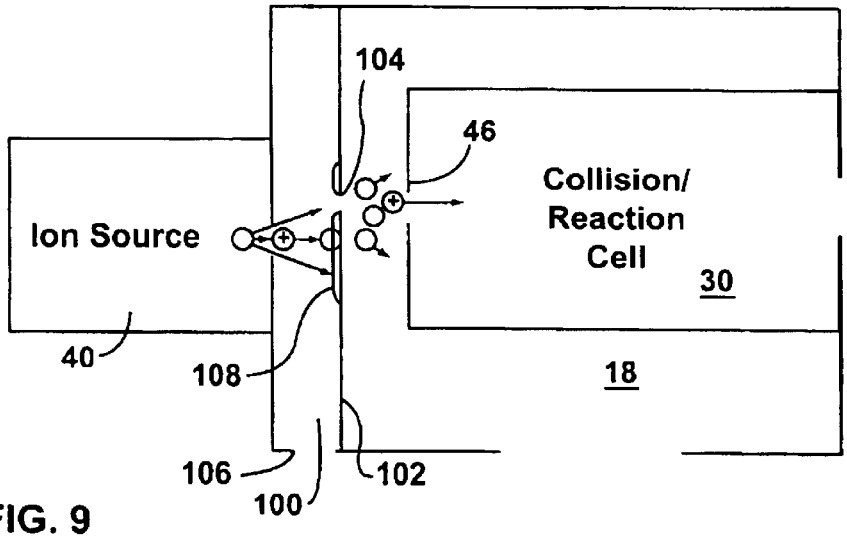

FIG. 9 shows a scheme similar to that shown in earlier U.S. Pat. No. 5,381,008. Here, an intermediate chamber 100 is provided, between the ion source 40 and the ion optics compartment 18. This is achieved by a wall 102 including an aperture 104.

As shown in that earlier U.S. patent, the opening 104 is offset, so that the supersonic flow impact the wall 102, where neutral particles and ions accumulate to produce a region of elevated pressure, as indicated at 108. From the region 108 neutral gas re-expands into the compartment 18 through the opening 104, but, due to lower pressure differential across the opening 104 than the original pressure differential in the ion source, the neutrals and ions acquire in the re-expansion velocity which is lower than the original supersonic flow velocity. As a result, impact pressure of the neutral gas at the entrance aperture 46 of the reaction cell 30 is lower, and neutral gas particles from the expansion are not entrained in the cell 30. Again, due to the electrostatic field or potential gradient, ions would tend to pass into the reaction cell 30.

Figure 10:
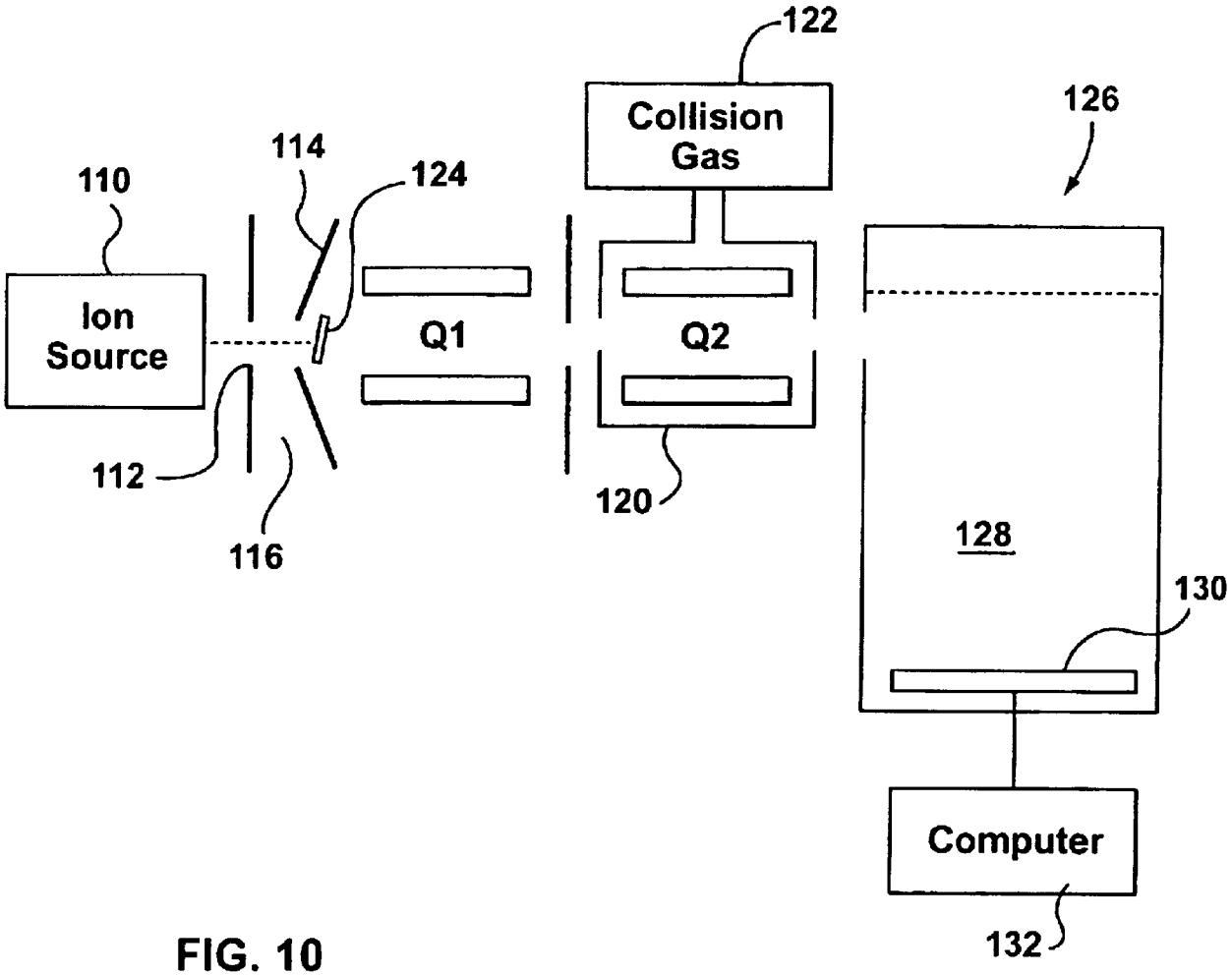
FIGS. 10 and 11 show exemplary mass spectrometer arrangements incorporating the present invention.

Reference is now being made to FIG. 10, which shows an ion source 110, and inlet aperture 112 and a skimmer 114. An intermediate pressure chamber 116 is formed.

Here, in a first chamber of the instrument or system, a first quadrupole rod set Q1 is provided. Q1 is operated as a resolving mass spectrometer, for selecting parent ions of interest, for transmission to a collision cell indicated at 120. In known manner, the collision cell 120 includes a second quadrupole (or other multipole) rod set Q2, and is supplied with a collision gas from a gas supply 122.

In accordance with the present invention, some form of device for separating ions from neutral particles and gas is provided between the skimmer 114 and the quadrupole rod set Q1, as indicated at 124. This device 124 can be anyone of devices shown in FIGS. 2–9.

Thus, in use, parent ions are selected in Q1 and transmitted into Q2 for fragmentation with the collision gas.

The resultant fragment ions pass from Q2 into a conventional time-of-flight mass spectrometer indicated at 126. This TOF 126 has a flight tube 128. A detector 130 is connected to a computer 132.

As detailed in earlier published PCT application WO98/56030, a limitation of a TOF mass spectrometer is that since sufficient time must be allowed for transit of the slowest ions through the flight tube to the detector 130, which limited the duty cycle. This can be overcome by applying a bandpass to Q2, with a high mass cutoff, to restrict the upper mass range of ions. This in turn can improve the duty cycle of the TOF 126, but this characteristic is not essential, and Q2 can be operated in a variety of modes.

In accordance with the present invention, to prevent contamination of the collision cell 120 with plasma gases or the like, the device 124 is provided.

Figure 11:
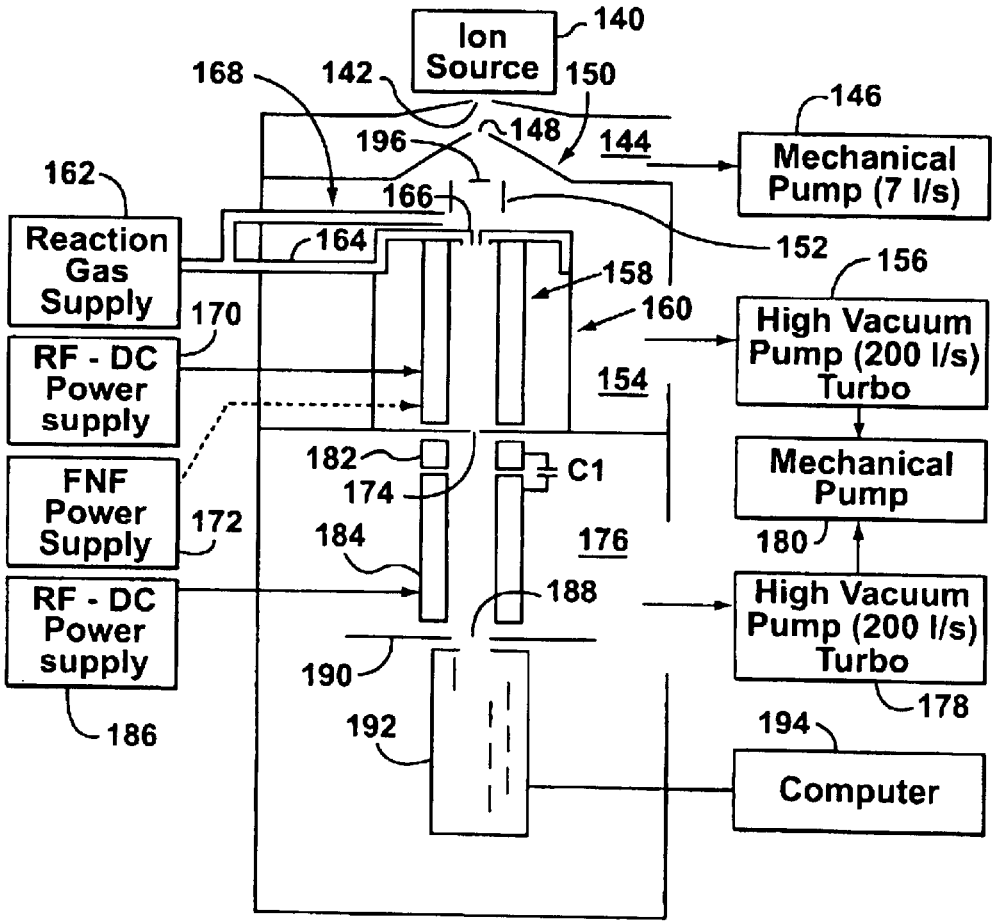

Referring now to FIG. 11, this shows another spectrometer configuration, taken from WO98/56030. Here, an ion source 140, which again typically will be a conventional inductively coupled plasma source, a glow discharge ion source or any other type of well known ion source. This injects the stream of ions and neutrals through as orifice 142 in a sampler plate into a first intermediate pressure vacuum chamber 144, evacuated by mechanical pump 146 to a pressure of, for example, –4 Torr.

The ions and neutrals then continue through an orifice 148 in a skimmer cone 150 through ion optics indicated at 152 in a first, main vacuum chamber 154, pumped by turbo pump 156 to a pressure of e.g. 1 mTorr.

The ions then flow into a multipole device 158, contained within a collision cell 160. The multipole device 158 can be a quadrupole, but may be an octapole or a hexapole or any other multipole as known in the art. Reactive collision gas is supplied to the interior of the collision cell 160 from a supply 162. In this embodiment, the supply is indicated as passing through a first conduit 164 to an annular opening 166 and through a second conduit 168 to a position just in front of the entrance to the collision cell 160.

An RF and DC power supply is indicated at 170. Also shown is a filtered noise field power supply 172.

Ions from the collision cell 160, pass from the multipole device 158 through an orifice 174 into a second main vacuum chamber 176, evacuated by a high vacuum turbo pump 178. In known manner, the pumps 156, 178 can be backed by a mechanical pump 180.

In the second main vacuum chamber 176, the ions preferably travel through a pre-filter 182 (typically an RF-only short set of quadrupole rods) into a mass analyzer 184. As indicated, the mass analyzer 184 and rod set 182 can be connected by capacitors. The mass analyzer 184 is, again, preferably a quadrupole mass analyzer, An RF and DC power supply 186 is provided for the quadrupole rod set or the mass analyzer 184.

From the mass analyzer 184, the ions travel through an orifice 188 in an interface plate 190 into a detector 192. The detector 192 is connected to a computer 194 for recording an ion signal.

In the first main vacuum chamber 154, the shadow stop 196 is positioned on the axis of the ion optics 152, the shadow stop 196 disrupting the supersonic flow of neutral gas and preventing the built of the impact pressure on the entrance of the collision cell 160 so that the pressure is not sufficiently high to force the neutral gas particles originating in the ion source 140 to enter the collision cell 160 pressurized by a reactive collision gas from the supply 162.

What is claimed is:

1. A mass spectrometer system comprising:

an ion source for producing an ion source stream comprising sample ions and neutrals;

an ion interface;

a reaction/collision cell section for processing the ions received from the ion interface, with the ion interface providing an interface for the ion source stream between the ion source and the reaction/collision cell section; and an ion-neutral decoupling device provided between the ion interface and the reaction/collision cell section, to provide substantial separation between ions and neutral particles.

2. A mass spectrometer system as claimed in claim 1, wherein the ion-neutral decoupling device comprises one of: a plate or a plurality of plates including apertures with the apertures offset from one another to prevent direct passage of neutral gas particles; a plurality of pairs of rods provided with slots for passage of ions and offset so as to interrupt passage of neutral gas particles; an electrostatic quadupole 90° deflector; and electrostatic sector deflector; a magnetic sector deflector; an obstruction preventing direct flow of neutral gas particles from the ion interface to the reaction/collision cell section; and a plate including an offset aperture and defining an intermediate pressure chamber between the ion interface and thereaction/collision cell section.

3. A mass spectrometer system as claimed in claim 2, which includes an ion optics compartment, wherein the ion-neutral decoupling device is provided in the ion optics compartment.

4. A mass spectrometer system as claimed in claim 3, wherein the reaction/collision cell suction includes a collision cell provided with a collision gas.

5. A mass spectrometer system as claimed in claim 4, which includes a mass analyzer downstream from the collision cell, for analyzing ions after collision and/or reaction in the collision cell.

6. A method of operating a mass spectrometer system, in which ions are generated and processed, the method comprising:

(i) supplying a sample to an ion source and generating an ion source stream, including sample ions and unwanted neutral particles;

(ii) separating neutral particles from an ion stream; and then (iii) passing the ion stream into a reaction/collision cell section.

7. A method as claimed in claim 6, wherein step (ii) includes subjecting the ions to deflection, utilizing deflection of the ions, while permitting the neutral gas flow to continue undeflected.

8. A method as claimed in claim 6, which includes passing the ion stream and neutral gas particles through a series of apertures in plates, the apertures being offset, and providing an electrostatic field to drive the ions through the apertures and the plates, the offset apertures serving to obstruct direct flow of neutral particles.

9. A method as claimed in claim 6, which includes generating the ion stream at atmospheric pressure, passing the ion stream through an aperture into an ion optics compartment maintained at a substantially sub-atmospheric pressure, thereby to generate an expanding supersonic jet, wherein step (ii) includes obstructing the supersonic jet, to obstruct passage of neutral particles into the reaction/collision cell section.

10. A method as claimed in claim 6 wherein step (iii) comprises passing the ions into the collision/reaction cell section for collision and/or reaction, and subsequently subjecting the ions to mass analysis.

* * * * *